US008787943B2

(12) United States Patent
Ghinamo

(10) Patent No.: US 8,787,943 B2
(45) Date of Patent: Jul. 22, 2014

(54) METHOD AND SYSTEM FOR LOCALIZING MOBILE COMMUNICATION TERMINALS

(75) Inventor: Giorgio Ghinamo, Turin (IT)

(73) Assignee: Telecom Italia S.p.A., Milan (IT)

( * ) Notice: Subject to any disclaimer, the term of this patent is extended or adjusted under 35 U.S.C. 154(b) by 134 days.

(21) Appl. No.: 13/121,143

(22) PCT Filed: Sep. 26, 2008

(86) PCT No.: PCT/EP2008/062924
§ 371 (c)(1),
(2), (4) Date: Mar. 25, 2011

(87) PCT Pub. No.: WO2010/034351
PCT Pub. Date: Apr. 1, 2010

(65) Prior Publication Data
US 2011/0244891 A1    Oct. 6, 2011

(51) Int. Cl.
*H04W 24/00* (2009.01)
(52) U.S. Cl.
USPC .......... 455/456.6; 455/456.1; 455/456.5; 342/357.24; 342/357.3; 701/23
(58) Field of Classification Search
USPC .......... 342/357.25, 357.3, 353, 357.24, 457; 701/472, 300, 14, 480, 23
See application file for complete search history.

(56) References Cited

U.S. PATENT DOCUMENTS

| 6,161,018 | A * | 12/2000 | Reed et al. | 455/456.1 |
|---|---|---|---|---|
| 6,433,733 | B2 * | 8/2002 | Syrjarinne et al. | 342/357.34 |
| 6,707,420 | B2 * | 3/2004 | Vayanos et al. | 342/357.23 |
| 6,957,072 | B2 * | 10/2005 | Kangras et al. | 455/456.1 |
| 7,499,710 | B2 * | 3/2009 | Da et al. | 455/456.1 |
| 2001/0022558 | A1 * | 9/2001 | Karr et al. | 342/450 |
| 2002/0097181 | A1 * | 7/2002 | Chou et al. | 342/357.06 |
| 2004/0077311 | A1 | 4/2004 | Riley | |
| 2004/0203853 | A1 * | 10/2004 | Sheynblat | 455/456.1 |
| 2008/0280624 | A1 * | 11/2008 | Wrappe | 455/456.1 |

FOREIGN PATENT DOCUMENTS

| WO | WO-03/092319 A1 | 11/2003 |
|---|---|---|
| WO | WO-2005/003809 A1 | 1/2005 |

OTHER PUBLICATIONS

A. D.Torre et al., "Analysis of the Accuracy of Indoor GNSS Measurements and Positioning Solution", European Navigation Conference (ENC), 13 pages (2008).
A. Leick, "Least-Squares Adjustments, Ellipses as Confidence Regions", GPS Satellite Survey, pp. 141-150 (2004).

(Continued)

*Primary Examiner* — Mahendra Patel
(74) *Attorney, Agent, or Firm* — Finnegan, Henderson, Farabow, Garrett & Dunner, L.L.P.

(57) ABSTRACT

Systems and methods are disclosed for determining a geographic position of a mobile communications terminal operable in a wireless communications network. According to one embodiment, a first estimated position of the mobile communications terminal may be calculated based on pseudo-range measurements related to a plurality of signals received from transmitters of a global navigation satellite system. Moreover, a second estimated position of the mobile communications terminal may be calculated based on information provided by the wireless communications network. The first estimated position may be analyzed to derive an indication of whether at least one of the pseudo-range measurements is affected by errors. If at least one of the pseudo-range measurements is affected by errors at least one third estimated position may be calculated based on a sub-set of pseudo-range measurements and evaluated against the first estimated position.

11 Claims, 3 Drawing Sheets

(56) References Cited

OTHER PUBLICATIONS

A. Leick, "Least-Squares Adjustments, Other Measures of Precision", GPS Satellite Survey, pp. 150-151 (2004).
Sairo et al., "Selective Combinations in Personal Satellite Navigation," IEEE A&E Systems Magazine, pp. 34-42, (2007).
Sairo, "Improving Stand-Alone GNSS Receiver Performance With Cell Data," ENC GNSS 2004, The European Navigation Conference, pp. 1-9, (2004).
International Search Report from the European Patent Office for International Application No. PCT/EP2008/062924 (Mail date Jul. 22, 2009).

* cited by examiner

METHOD AND SYSTEM FOR LOCALIZING MOBILE COMMUNICATION TERMINALS

CROSS REFERENCE TO RELATED APPLICATION

This application is a national phase application based on PCT/EP2008/062924, filed Sep. 26, 2008, the content of which is incorporated herein by reference.

BACKGROUND OF THE INVENTION

1. Field of the Invention

The present invention generally relates to techniques for the localization of mobile communications terminals like cellular phones. More specifically, the invention concerns a method and a system for increasing the mobile terminals' localization accuracy.

2. Description of the Related Art

Geographic localization of mobile communications terminals like cellular phones, smart phones and similar handheld devices operable with mobile communications networks can be exploited in a variety of services and applications, such as location-sensitive yellow-pages services (e.g., exploiting the known location of a mobile terminal for providing to the user information about restaurants, hotels, etc. in his/her location neighborhood), services offered to communities of users (e.g., friend/family member find services), location-sensitive call billing schemes. Locating mobile communications terminals is also of great importance in case of emergency calls.

Several techniques are known in the art that allow the geographic localization of mobile terminals.

Satellite-based geolocating systems like the GPS (Global Positioning System) are an effective solution for localizing mobile communication terminals. As known in the art, the GPS comprises a "constellation" of satellites that orbit around the earth; each GPS satellite carries a GPS transmitter that transmits GPS signals encoded with information that allows GPS receivers on earth to measure the time of arrival of the received signals relative to an arbitrary point in time: this relative time-of-arrival measurement may then be converted to a "pseudo-range" measure (a measure of the apparent propagation time from the satellite to the GPS receiver, expressed as a distance).

The position (latitude, longitude, height) and the clock offset of a GPS receiver may be accurately estimated based on a sufficient number of available pseudo-range measurements (typically four). Calculating the position (the so-called "GPS fix") of a GPS receiver involves solving a system of equations where the unknown variables are the GPS receiver geographic coordinates to be determined and the offset between the receiver clock and the GPS system clock.

The GPS performance is rather good in open-sky conditions when the number of received signals is equal to or greater than 5 and all the received signals are in "Line of Sight" (LOS). Depending on the specific signal processing techniques and PVT (Position Velocity Time) algorithms implemented at the GPS receiver, the localization accuracy may in these conditions vary from approximately 2 m to few millimeters.

GPS signals are received at very low power levels, due to the relatively large distances between the satellites and the receivers, and most GPS receivers have great difficulty in receiving GPS signals when they happen to be inside a building, under dense foliage, in urban settings in which tall buildings block much of the sky visibility, and so on.

However, the increase in sensitivity of the GPS receivers has made it possible to use the GPS also not in open-sky, LOS conditions, as it is normally the case of urban and indoor environments, where there is no direct visibility of the satellites and the GPS signal is received after having been diffracted, reflected and strongly attenuated by surrounding obstacles.

GPS techniques in these environments are called High-Sensitivity GPS (HSGPS).

Further improvements in the sensitivity of GPS receivers, as well as the deployment of GNNS (Global Navigation Satellite Systems) complementary to the GPS, like Galileo, are expected to partially overcome the problem of the signals obstruction.

Other known geographic localization techniques of mobile communications terminals rely on information made available by wireless communications networks like cellular networks (PLMNs—Public Land Mobile Networks).

For example, exploiting information adapted to identify the network cell ("cell-ID") covering ("serving") the area where a cellular phone is located, possibly in combination with measurements of the power levels of the signals from the neighboring network cells, the location of the cellular phone can be determined. Another technique, that can be exploited in so-called "synchronous" PLMNs (PLMNs in which the different base radio stations of the network modulate the signals synchronously to a common time base unique for the whole network), is based on the E-OTD (Enhanced Observed Time Difference), i.e. on measurements of the propagation delays of the signals transmitted by the PLMN's base radio stations. In non-synchronous PLMNs, mechanisms could in principle be implemented for measuring the phase mismatch between the various signals, however the implementation of these mechanisms is complex and expensive.

A critical aspect of geographic localization techniques in general, and of mobile terminals in particular, is the accuracy by which the geographic location can be established.

For example, the location of a mobile terminal making an emergency call should be determined as precisely as possible, or at least an indication of the degree of uncertainty associated with the determined location of the mobile terminal should be provided, in order to ease the task of finding where the user who placed the call is, and e.g. rescue him/her. The regulatory authorities of some countries have in this respect also set forth minimum accuracy standards.

As far as the GPS is concerned, in open-sky conditions the errors affecting the pseudo-range measurements are estimated by the network of GPS monitoring stations. The statistics of the error is of Gaussian type, and it is characterized by a standard deviation $\sigma_j$. In urban and indoor environments, when the GPS signal received by the GPS receivers is strongly attenuated, the error statistics estimated for the open-sky conditions is however not reliable. Nevertheless, it is possible to characterize the pseudo-range measurement error on the basis of measures of the signal-to-noise ratio. In conditions of strong multipath signal propagation, by using the signal-to-noise ratio measures, it is possible to estimate an average bias error (i.e., an error that causes the statistical distribution not to be centered around a zero value, being instead biased to a different value) affecting the pseudo-range measures, caused by the summation of all the multipath contributions or by a strong reflection, and a respective variance; the noise can thus be described in terms of bias and variance, as if it were a Gaussian variable. The average bias is used to correct the pseudo-range measurement, whereas the variance is exploited for assigning a weight to the individual measurements during the resolution of the system of equations for estimating the position of the GPS receiver. As a result of the calculation of the position, the error in the GPS fix is estimated; under the hypothesis that the error affecting the measurements follows the previously defined statistic, the error affecting the GPS fix is Gaussian, and has a variance that depends on the variance of the individual measurements and on the geometry of the satellite constellation.

There are however situations in which the multipath GPS signal propagation causes the usual error statistics not to be valid; this happens for example when errors derive from relatively high delays in the pseudo-range, that deviate from and are not covered by the statistical model previously defined, due for example to particularly unfavorable environmental conditions, like reflecting walls at a distance of several tens of meters and obstructions to the LOS propagation path, or to peculiar combinations of several multipath signal propagation contributions generated by near obstacles, or thermal-noise induced error in the signaling process performed during the pseudo-range estimation.

When the number of different satellite transmitter signals received by a GPS receiver is higher than the number of unknown variables in the mathematical system of equations to be solved for calculating the GPS fix (typically, when pseudo-range measurements for more than four satellites are available at the GPS receiver), the quality of the calculated GPS fix can be assessed by conducting a statistical test ("integrity test") on the post-fix residues, which are the differences between the measured pseudo-range values and the expected pseudo-range values calculated on the basis of the obtained GPS fix. The integrity test checks whether the square of the post-fix residues, normalized to the hypothesized variance, is less than a preset threshold, that depends on the degrees of freedom (number of available pseudo-range measurements less the number of unknown variables in the equations system to be solved). If the integrity test is not passed, it is possible to try and recalculate the GPS fix, and applying again the integrity test, after discarding one of the available measurements. By recursively applying this procedure (hereinafter also referred to as the Fault Detection and Exclusion or FDE algorithm), discarding one of the available pseudo-range measurements at a time, outliers, i.e. pseudo-range measurements affected by gross errors, can be detected, and the accuracy of the GPS fix can be increased.

In A. Dalla Torre et al., "Analysis of the Accuracy of Indoor GNSS Measurements and Positioning Solution", European Navigation Conference (ENC) 2008, Toulouse, Apr. 23-25 2008, the integrity test has been adapted to the conditions typical of urban and indoor environments.

The level of accuracy offered by geographic location techniques based on PLMNs depends on the specific service architecture. For example, in the technique using the cell-ID, the accuracy of the position calculated based on the PLMN's information ("PLMN fix") depends on the network cells' density; in urban environments, where the cells' density is high, the accuracy of the determined mobile terminal's position is, with a reasonable degree of likelihood, of the order of 100-200 m; the accuracy falls to some kilometers in suburban/extraurban environments, where the cells are less dense. Based on information about the cells' density, it is also possible to associate with each PLMN fix a corresponding estimate of the uncertainty area, usually expressed as a parameter representing the radius of a circular area around the estimated position where the likelihood of actually finding the mobile terminal is approximately equal to 67%; by multiplying this radius for a suitable coefficient, the desired degree of confidence of the calculated PLMN fix can be obtained. In the case of the E-OTD technique, the accuracy of the PLMN fix similarly depends on the cells' density; in urban areas, the accuracy is, with a 67% degree of likelihood, of about 150 m, whereas in rural areas the accuracy falls to 250 m; signals from three network cells need however to be available to implement this technique.

Hybrid techniques for determining the geographic position of mobile communications terminals are also known in the art. Generally, the joint use of different technologies for the geographical localization is called "hybrid location". In particular, the fix of a mobile communications terminal can be calculated by jointly exploiting the GPS and the PLMN.

In WO 2003/92319, an accurate position estimate for the wireless terminal is initially obtained (e.g., based on a first—accurate—position determination sub-system). For each of one or more transmitters (e.g., base stations) in a second (less accurate) position determination sub-system, an 'expected' pseudo-range is computed based on the accurate position estimate for the terminal and the base station location, a 'measured' pseudo-range is also obtained, and a pseudo-range residual is then determined based on the expected pseudo-range and the measured pseudo-range. Thereafter, to determine an updated position estimate for the terminal, measured pseudo-ranges are obtained for a sufficient number of transmitters. The updated position estimate is then determined based on the pseudo-ranges for these transmitters.

In WO 2005/003809, the location of a mobile terminal in a given area is determined by including the mobile terminal both in a satellite-based positioning system and in a cellular communications system. The mobile terminal is thus adapted to receive satellite signals from the satellite-based system and to be covered by at least one cell of the cellular communications system. The mobile terminal is configured for determining at least approximately its coordinates, including an altitude coordinate in said area, based on both satellite signals received from the satellite-based system and information related to the cellular communication system. An estimate of the altitude coordinate is derived from the information related to the cellular communications system, whereby satisfactory location performance is ensured also when one or more satellites in the satellite-based system are not visible at the mobile terminal.

SUMMARY OF THE INVENTION

The Applicant has observed that in the hybrid solution disclosed in WO 2003/92319, exploiting the E-OTD technique and thus tailored for synchronous PLMNs, the fix is calculated jointly using the GPS pseudo-range measurements and the PLMN range measurements, when the available GPS pseudo-range measurements are not enough in number for solving the system of equations.

The Applicant has tackled the problem of how to assess the integrity of a calculated GPS fix also in those cases where the redundancy of the available pseudo-range measurements, i.e. the number of visible satellites, is sufficient to perform the integrity check, but, based on the latter, it is not possible to detect the outliers by means of the FDE algorithm (this is for example the case where the degree of freedom is one), or even when the redundancy might prevent application of the integrity test (such as in those cases where the degree of freedom is zero)

The Applicant has found that data derived from a PLMN can be expediently used to identify and, possibly, discard the GPS pseudo-range measurements that, more than others, are affected by gross errors (i.e., outliers), which are the primary responsible of the worsening in the GPS fix accuracy.

According to an aspect of the present invention, a method is provided of determining a geographic position of a mobile communications terminal operable in a wireless communications network and comprising a receiver of signals of a global navigation satellite system, the method comprising:

- calculating a first estimated position of the mobile communications terminal based on pseudo-range measurements related to a plurality of signals received from transmitters of the global navigation satellite system;
- calculating a second estimated position of the mobile communications terminal based on information provided by the wireless communications network;
- analyzing the first estimated position to derive an indication of whether at least one of the pseudo-range measurements is affected by errors, wherein said analyzing includes exploiting the calculated second estimated position to derive said indication;
- in case an indication that at least one of the pseudo-range measurements is affected by errors is obtained as a result of said analyzing:
  - calculating at least one third estimated position based on pseudo-range measurements related to a respective sub-set of said plurality of signals received from transmitters of the global navigation satellite system,
  - evaluating whether the at least one third estimated position is more accurate than the first estimated position; and
  - in the affirmative case, taking as estimated position of the mobile communications terminal the calculated third estimated position.

Said analyzing the first estimated position may comprise comparing the first estimated position to the second estimated position; said indication that at least one of the pseudo-range measurements is affected by errors may be derived in case the first estimated position differs from the second estimated position of more than a preset amount; said evaluating whether the at least one third estimated position is more accurate than the first estimated position may comprise comparing the third estimated position to the second estimated position.

Said calculating at least one third estimated position may comprise calculating at least two third estimated positions, each one corresponding to a different sub-set of said plurality of signals received from transmitters of the global navigation satellite system. Said taking as estimated position of the mobile communications terminal the third estimated position may comprise taking as estimated position of the mobile communications terminal the one, among the at least two third estimated positions, that is closer to the second estimated position.

Said analyzing the first estimated position may comprise calculating a first degree of accuracy of the first estimated position, obtaining an indication of a second degree of accuracy of the second estimated position, performing the step of comparing the first estimated position and the second estimated position in case the first degree of accuracy is better than the second degree of accuracy.

Said calculating a first degree of accuracy may comprise exploiting a variance/covariance matrix of an error estimated while calculating the first estimated position; alternatively, it may include estimating an affecting the first estimated position a Distance Root Mean Square—DRMS calculated as:

$$DRMS = \sqrt{\sigma_{x1}^2 + \sigma_{x2}^2}$$

where $\sigma_{x1}$ and $\sigma_{x2}$ are diagonal elements in a north-east-up reference system.

The step of comparing may comprise comparing a deviation of the first estimated position with respect to the second estimated position to a threshold related to the first degree of accuracy.

Said analyzing the first estimated position may comprise performing a statistical integrity test on post-fix residuals obtained calculating a difference between the pseudo-range measurements and the first estimated position.

Said calculating at least one third estimated position based on pseudo-range measurements related to a respective sub-set of said plurality of signals received from transmitters of the global navigation satellite system may comprise solving a system of equations including said pseudo-range measurements related to said respective sub-set of said plurality of signals and estimated coordinates of the mobile communications terminal corresponding to the second estimated position.

Said taking as estimated position of the mobile communications terminal the calculated third estimated position may include discarding from said plurality of signals received from transmitters of the global navigation satellite system the signal affected by an error greater than a predetermined amount.

According to another aspect of the present invention, a system is provided for determining a geographic position of a mobile communications terminal operable in a wireless communications network and comprising a receiver of signals of a global navigation satellite system. The system comprises:

- first calculation modules operable to calculate a first estimated position of the mobile communications terminal based on pseudo-range measurements related to a plurality of signals received from transmitters of the global navigation satellite system;
- second calculation modules operable to calculate a second estimated position of the mobile communications terminal based on information provided by the wireless communications network;
- estimated position analysis modules operable to analyze the first estimated position exploiting the second estimated position to derive an indication of whether at least one of the pseudo-range measurements is affected by errors and, in case an indication is derived that at least one of the pseudo-range measurements is affected by errors as a result of said analyzing, further operable to:
  - causing the first calculation modules calculate at least one third estimated positions based on pseudo-range measurements related to a respective sub-set of said plurality of signals received from transmitters of the global navigation satellite system,
  - evaluating whether the at least one third estimated position is more accurate than the first estimated position; and
  - in the affirmative case, taking as estimated position of the mobile communications terminal the third estimated position.

Still another aspect of the present invention relates to a mobile communications terminal operable in a wireless communications network and comprising a receiver of signals of a global navigation satellite system, the mobile communications terminal comprising:

- a calculation module operable to calculate a first estimated position of the mobile communications terminal based on pseudo-range measurements related to a plurality of signals received from transmitters of the global navigation satellite system;
- an estimated position analysis module operable to receive a second estimated position from the wireless communication network and to analyze the first estimated position exploiting the second estimated position to derive an indication of whether at least one of the pseudo-range measurements is affected by errors and, in case an indication is derived that at least one of the pseudo-range measurements is affected by errors as a result of said analyzing, further operable to:

causing the calculation module calculate at least one third estimated position based on pseudo-range measurements related to a respective sub-set of said plurality of signals received from transmitters of the global navigation satellite system, evaluating whether the at least one third estimated position is more accurate than the first estimated position; and in the affirmative case, taking as estimated position of the mobile communications terminal the third estimated position.

BRIEF DESCRIPTION OF THE DRAWINGS

These and other features and advantages of the present invention will be made clearer by the following detailed description of some embodiments thereof, provided merely by way of non-limitative examples, description to be read in conjunction with the attached drawings, wherein.

DETAILED DESCRIPTION OF EMBODIMENTS OF THE INVENTION

Figure 1:
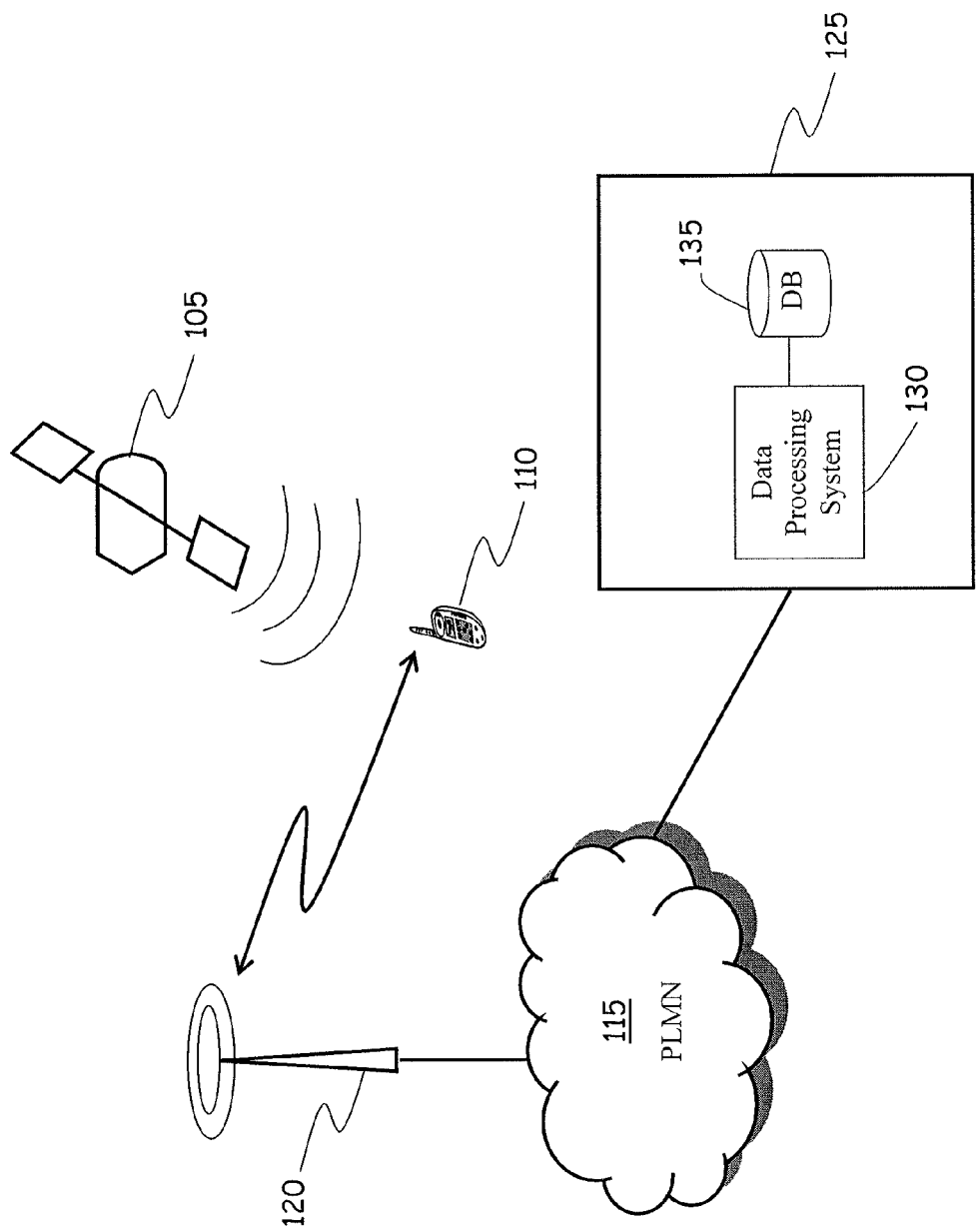
FIG. 1 schematically depicts, by way of a block diagram, a general architecture of a system according to an embodiment of the present invention.

Referring to the drawings, FIG. 1 schematically shows the general architecture of a mobile communications terminal geolocation system according to an embodiment of the present invention.

Reference numeral 105 denotes a signal source, e.g. a transmitter transported by one of the plurality of satellite vehicles making up the constellation of satellite vehicles of a GNSS like the GPS. The signal source 105 is configured to transmit microwave radio carrier signals, at a prescribed frequency (e.g., the so-called "L1 frequency"), modulated (spread) by a unique scrambling code, uniquely assigned to that transmitter, and by data bits making up a navigation message. The navigation message transmitted by the generic transmitter includes inter alia the GPS satellite vehicle's orbit parameters (including the so-called "almanac" and "ephemeris"), clock corrections, and other parameters; all these data are useful for the receiver to calculate and update its location on the Earth surface.

Reference numeral 110 denotes a mobile communications terminal, like for example a cellular phone or a smartphone, more generally any device operable in a PLMN 115, like for example a GSM (General System for Mobile communications) or a UMTS (Universal Mobile Telecommunications System), having a Radio Access Network (RAN) comprising a plurality of base radio stations 120, like for example Base Transceiver Stations (BTSs) of a GSM network or NodeBs of a UMTS network. Each base radio station 120 covers a respective geographic area, commonly referred to as a cell.

The mobile communications terminal 110 also includes a GNSS signal receiver, like a GPS receiver, configured to receive the signals transmitted by the signal source 105 of the GPS.

Coupled (wired or wirelessly) to the PLMN 115 is a service center 125, operable to provide to the mobile communications terminal 110 services aiding the process of geolocation of the mobile communications terminal. The service center 125 may include a data processing system 130, e.g. a computer, coupled to a database 135 adapted to store reference data useful for aiding the mobile communications terminal 110 in the process of determination of its geographic position, as will be described in greater detail in the following.

Figure 2:
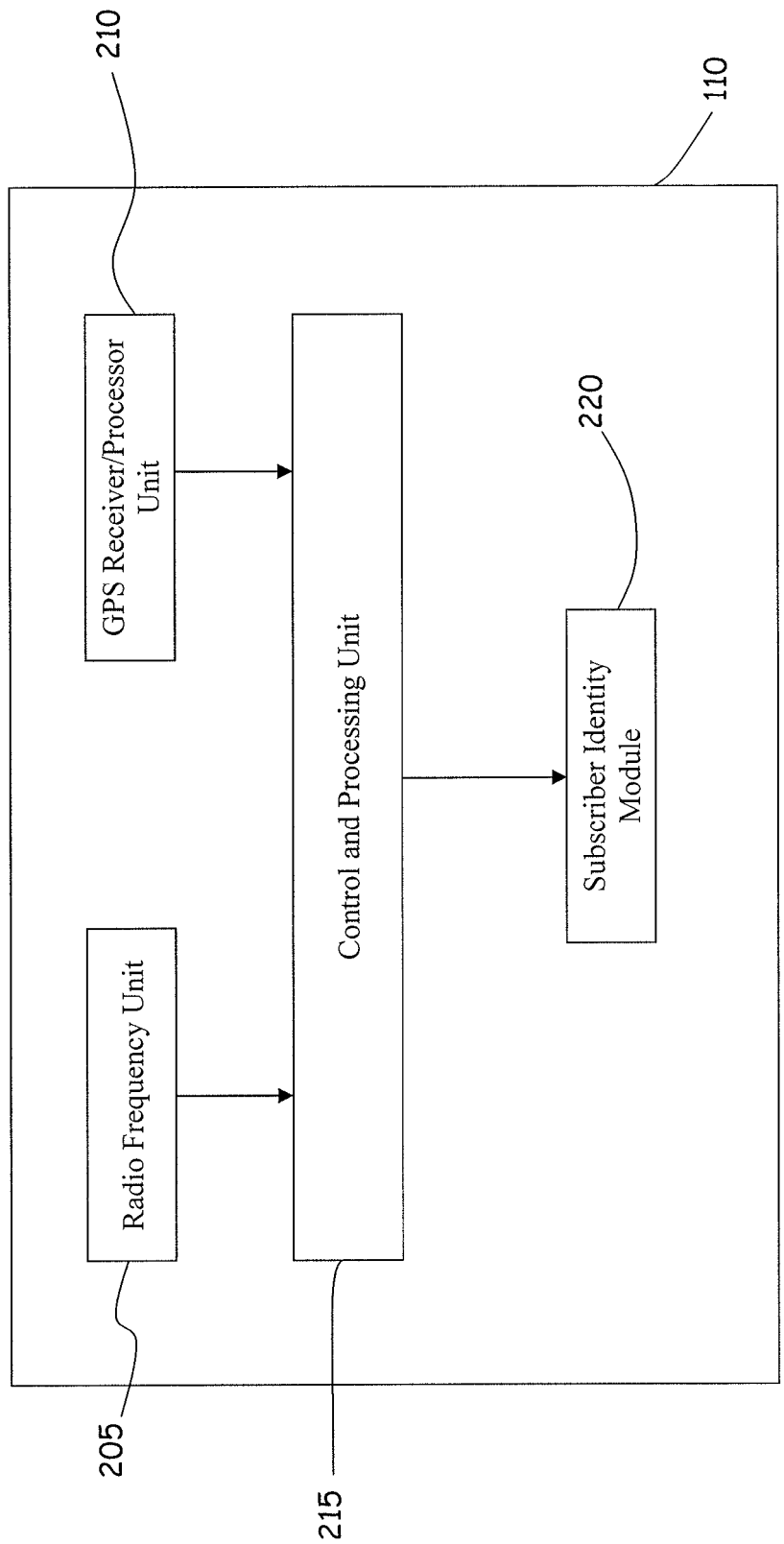
FIG. 2 is a schematic functional block diagram of a mobile communications terminal according to an embodiment of the present invention.

As schematically shown in FIG. 2, the mobile communications terminal 110 comprises a radio frequency unit 205, enabling communications with the base radio stations 120 of the PLMN 115, a GPS receiver/processor unit 210, and a control and processing unit 215, coupled to the radio frequency unit 205 and to the GPS receiver/processor unit 210, and operable to control the operation of the mobile communications terminal 110 based on firmware/software modules, stored/installed in the mobile communications terminal 110, and based on the interaction with a Subscriber Identity Module 220, e.g. a GSM SIM or a UMTS U-SIM, adapted in particular to support the user profile (including information adapted to univocally identify the subscriber to the PLMN).

The mobile communications terminal 110 is adapted to obtain from the base radio stations 120 of the PLMN 115 respective identifiers ("cell-ID"), univocally identifying the cell of the PLMN to which the mobile terminal is camped and the neighboring cells; the mobile communications terminal 110 is also adapted to perform measurements of the strength of the signals transmitted by the base radio stations 120 and received by the mobile communications terminal 110.

In an embodiment of the present invention, the service center 125 is operable to estimate, based on information stored in the reference database 135, and on information provided by the mobile communications terminal 110 to the PLMN 115, the height (altitude, generally denoted as coordinate z) of the location at which the mobile communications terminal 110 is, when it is attached to a certain base radio station 120 of the PLMN 115.

Figure 3:
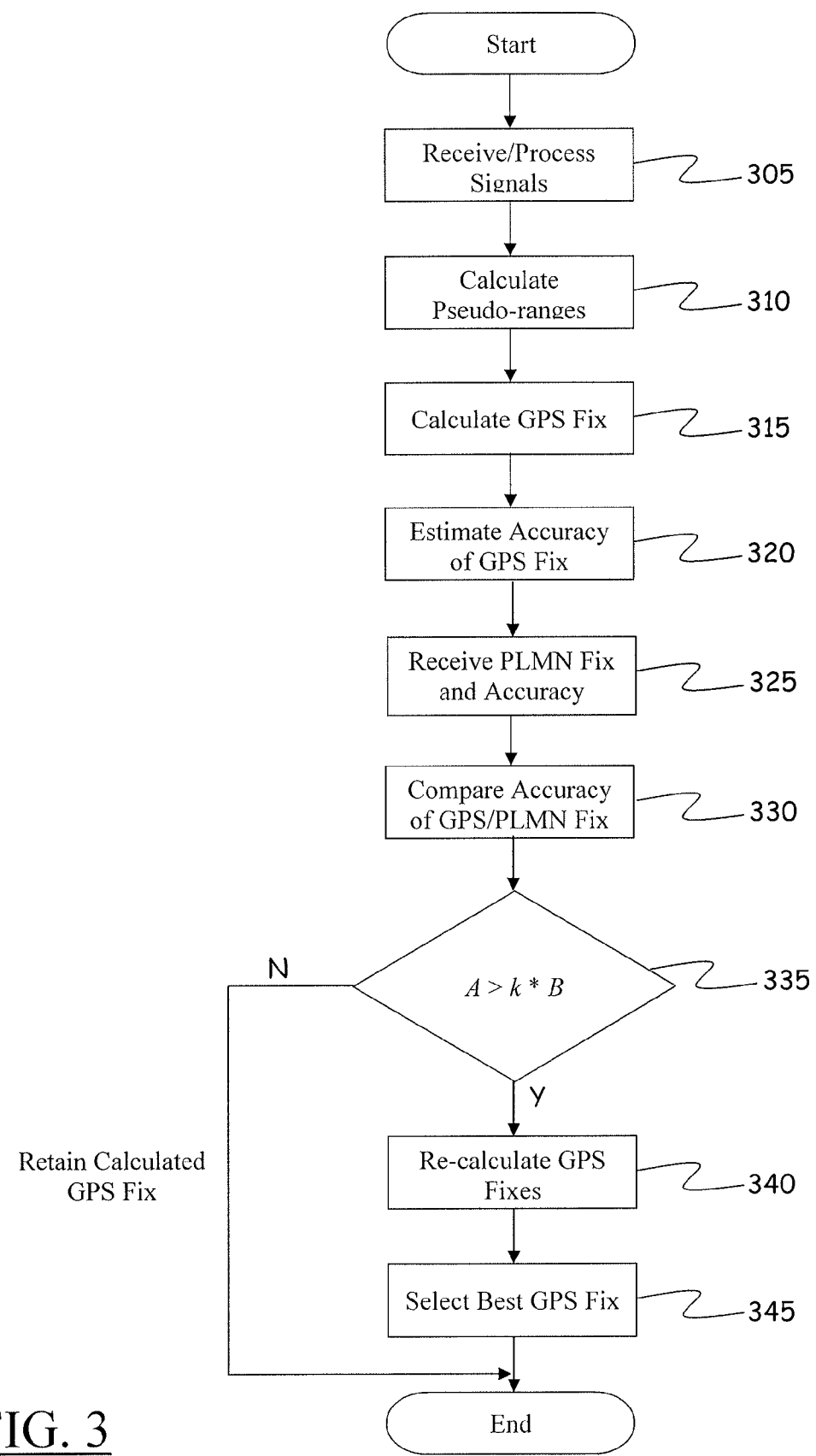
FIG. 3 is a schematic flowchart with the main steps of a method according to an embodiment of the present invention.

A method of determining the geographic position of the mobile communications terminal according to an embodiment of the present invention will be now described. FIG. 3 depicts, in terms of a schematic flowchart, the main actions performed by the mobile communications terminal 110.

The GPS receiver/processor unit 210 in the mobile communications terminal 110 receives, decodes and processes signals transmitted by the transmitters 105 on the satellite vehicles of the GPS (block 305). In a so-called "Assisted GPS"—A-GPS—architecture, the GPS receiver/processor unit 210 in the mobile communications terminal 110 may receive assistance data (including for example the GPS satellite vehicle's orbit parameters—the almanac and the ephemeris—, an indication of the delay of the satellite transmitter clock, clock corrections, and other parameters), for example from a server (not shown in the drawings) configured to provide assistance to the GPS receivers in the processes of code and carrier phase measurement of the GPS signal and position, time and velocity estimation. In this case, the GPS receiver/processor unit 210 in the mobile communications terminal 110 does not need to decode the received signals.

Generally, the GPS receiver/processor unit 210 receives signals from only a limited subset of the GPS transmitters, which are carried by satellite vehicles that are visible to the GPS receiver/processor unit 210 in the specific location where the mobile communications terminal 110 currently is.

The GPS receiver/processor unit 210, based on the received GPS signals, performs measures of pseudo-range (block 310); one pseudo-range measure is calculated for each one of the received GPS signals. A pseudo-range $\rho_i$ is calculated as follows:

$$\rho_i = \sqrt{(x_{Si}-x_u)+(y_{Si}-y_u)+(z_{Si}-z_u)} + c\delta t_u$$

where $(x_{Si}, y_{Si}, z_{Si})$ are the coordinates of the i-th satellite vehicle (latitude, longitude and altitude, or height), obtained using ephemeris data transmitted by the satellite transmitter; $(x_u, y_u, z_u)$ are the unknown geographic coordinates of the mobile communications terminal 110, c is the speed of light, and $\delta t_u$ is the unknown offset of the GPS receiver clock compared to the GPS time scale.

In order to determine the location of the mobile communications terminal, i.e. to calculate the GPS fix, a system of mathematical equations is to be resolved to obtain the values of the unknown quantities (block 315). Since the unknown quantities are four, at least four pseudo-range measures are necessary.

The number of pseudo-range measurements necessary to determine the location of the mobile communications terminal 110 can be reduced, compared to the number of four mentioned above, by exploiting the services of the service center 125. In particular, the service center 125, based on information that the PLMN 115 receives from the mobile communications terminal 110, like the identifier (cell-ID) of the base radio station 120 of the PLMN 115 the mobile communications terminal 110 is currently attached to (such base radio station being the so-called "best server" of the area where the mobile communications terminal is currently located), may look at the database 135 and extract therefrom an indication of the height (altitude) of the base radio station 120 to which the mobile communications terminal 110 is currently attached to; the extracted altitude indication may thus be provided to the mobile communications terminal 110, in order to reduce the number of unknown quantities from four to three, so that the minimum number of pseudo-range measurements necessary to determine the location of the mobile communications terminal 110 reduces as well from four to three. As described in WO 2005/003809, which is incorporated herein by reference, the database 135 may be a geographic database of the geographic area covered by the PLMN 115, including data on buildings, configuration data of the PLMN 115, like the locations of the base radio stations and antennas' radiation patterns; based on this information, a recursive procedure may be implemented which initially estimates the mobile communications terminal's position without setting the altitude thereof, and then refines the position estimation exploiting the information derived from the geographic database 135. Alternatively, the altitude may also be derived by setting it equal to the altitude, over the sea level, of the site of the best server base radio station, or to the minimum value or an average value of the altitudes, over the sea level, of the base radio stations nearest to the mobile communications terminal 110 (the best server base radio station and the neighboring base radio stations). In addition to the indication of height, a corresponding indication of the uncertainty of the height indication (obtainable from the buildings geographic database) might be provided to the mobile communications terminal 110.

The number of unknown quantities, and thus the number of pseudo-range measurements necessary to solve the system of mathematical equations that provides the mobile communications terminal's GPS fix, can also (further) be reduced in case information about the offset of the GPS receiver's clock compared to the GPS time is available; for example, using GPS receivers featuring local oscillators adapted to generate a clock which is sufficiently stable compared to the GPS time allows eliminating the uncertainty on the offset $\delta t_u$ (in this respect, an estimation of the real offset may be periodically performed, to compensate for long-term clock drifts; the offset estimation is reliable when performed on strongly received signals—available in optimal satellite constellation conditions —, which are characterized by a straight signal propagation path and low noise).

Assuming that a number of pseudo-range measurements is available that is sufficient for solving the system of mathematical equations, the GPS fix of the mobile communications terminal 110 can thus be calculated (block 315).

The accuracy of the calculated GPS fix is then estimated (block 320).

In urban/indoor environments, the GPS fix accuracy may for example be estimated exploiting the variance/covariance matrix of the error estimated while solving the system of mathematical equations, as described for example in A. Leick, "GPS Satellite Survey", 2004, John Wiley & Sons, paragraph 4.9, pages 141-150. The error variance/covariance matrix describes an ellipsis within which the 67% of the measurements are included (in terms of main and minor ellipsis axes and inclination); using the error variance/covariance matrix, measure confidence intervals for the 95% and 99% of the cases can be derived.

Another way for estimating the GPS fix accuracy, disclosed for example in A. Leick, "GPS Satellite Survey", 2004, John Wiley & Sons, pages 150-151, exploits as a measure of the error the Distance Root Mean Square (DRMS):

$$\text{DRMS} = \sqrt{\sigma_{x1}^2 + \sigma_{x2}^2}$$

where $\sigma_{x1}$ and $\sigma_{x2}$ are the diagonal elements in the north-east-up reference system; the DRMS error measure represents from the 64% to the 77% of the measurements, and the parameter 2*DRMS covers from 95% to 98% of the solutions.

Then, the position of the mobile communications terminal 110 is estimated exploiting the information available to the PLMN 115. For example, according to an "enhanced Cell-ID" technique, the mobile communications terminal 110 provides to the PLMN 115 information about which is the best server base radio station it is currently attached to (cell-ID of the best server cell), and the results of measurements, conducted by the mobile communications terminal 110, of the strength (power) of the radio signals received from the neighboring base radio stations (cells in the neighborhood of the best server cell). Alternatively, in case the PLMN is synchronous, the mobile communications terminal 110 may provide to the PLMN 115 measures of the signals propagation delays (EOTD). The service center 125 receives this information from the PLMN 115 and estimates the position of the mobile communications terminal 110 (hereinafter, the "PLMN fix"). The accuracy of the PLMN fix is also calculated; the accuracy of the PLMN fix depends for example on the density of the PLMN cells in the considered environment, and in a urban/indoor environment it may be of the order of 200 m applying the enhanced cell-ID technique; in case of a synchronous PLMN, the estimated accuracy depends on the PLMN geometry, on multipath signal propagations phenomena and signal refractions.

The PLMN fix and the related accuracy are communicated to the mobile communications terminal 110, which receives these data (block 325).

The mobile communications terminal 110 then computes the deviation of the GPS fix compared to the PLMN fix calculated by the service center 125 and provided thereto (block 330).

The mobile communications terminal 110 also checks whether the estimated accuracy of the GPS fix is higher than the accuracy of the PLMN fix (i.e. if the position calculated exploiting the GPS measurements is more accurate, precise than the position calculated exploiting the PLMN data) (block 330).

In case the GPS fix accuracy is much worse than the PLMN fix accuracy (e.g., the precision of the GPS fix is not higher than 1500 m, whereas that of the PLMN fix is better than 500 m), the PLMN fix may be elected as the position of the mobile communications terminal. Since the PLMN fix error is more difficult to characterize statistically, it is advisable to elect the PLMN fix as the mobile communications terminal's estimated position only in those cases where the GPS fix accuracy is very low.

If the GPS fix accuracy is not dramatically lower than the PLMN fix accuracy, or if it is better than the PLMN fix accuracy, the mobile communications terminal 110 may try to improve the GPS fix accuracy by assessing whether one or more of the pseudo-range measurements are affected by a gross error.

To do this, according to an embodiment of the present invention, the mobile communications terminal 110 checks whether the ratio of the deviation of the GPS fix compared to the PLMN fix to the GPS fix accuracy exceeds a threshold; denoting with A the deviation of the GPS fix compared to the PLMN fix, and B the GPS fix accuracy, the check performed by the mobile communications terminal 110 is directed to assess whether A>k*B, where k is a preset factor (established for example empirically), with k≥1 (block 335).

In the negative case (exit branch N of block 335), the calculated GPS fix is retained.

In the affirmative case (exit Y of block 335), i.e. if the deviation of the GPS fix compared to the PLMN fix exceeds the threshold, the mobile communications terminal 110 attempts to identify whether one of the pseudo-range measurements is affected by a gross error (i.e., it is an outlier). To this purpose, the mobile communications terminal 110 may for example re-calculate GPS fixes by recursively excluding from the system of mathematical equations one of the pseudo-range measurements at a time (block 340). In this way, a set of GPS fixes are obtained. While re-calculating the GPS fix, the mobile communications terminal 110 each time estimates the associated accuracy, for example by calculating the associated DRMS. If the estimated GPS fix accuracy worsens more than a predetermined amount (for example, some units) compared to the accuracy estimated for the initially calculated GPS fix, that re-calculated GPS fix is discarded (because even if the re-calculated GPS fix more closely approximates the PLMN fix, this might be merely casual, and not be indicative of the identification of a pseudo-range measure affected by gross errors).

The mobile communications terminal 110 then compares each of the re-calculated (and not discarded) GPS fixes to the PLMN fix, and selects as the GPS fix the one which minimizes the difference with the PLMN fix (block 345).

Thus, according to an embodiment of the present invention, an FDE algorithm is implemented which, in order to detect a fault due to outliers (and thus to recalculate the GPS fix excluding the outlier), exploits data provided by the PLMN network.

The FDE method according to the described embodiment of the invention is advantageous because, compared to the known statistical fault-detection method based on the post-fix residuals (integrity test), it needs one pseudo-range measurement less to be available at the GPS receiver; the method is thus particularly useful in those cases where the number of satellite transmitter signals received by the GPS receiver (i.e., the number of satellite visible to the GPS receiver) is small, like in urban/indoor environments; these environments are, in turn, those in which the position estimated based on the PLMN data is more precise, accurate, because the PLMN cells are denser.

The method according to the described embodiment of the invention is thus useful in those cases when an integrity test with a statistical procedure is implemented, but an FDE method based on the post-fix residuals cannot be applied, because the number of degrees of freedom (i.e., the number of available pseudo-range measurements minus the number of unknown quantities to be determined) is equal to 1.

In any case, the method according to the described invention embodiment is also useful as a secondary test to accompany the statistical test based on the post-fix residues, where the latter test does not allow identifying pseudo-range measurements affected by gross errors.

The integrity test can be implemented for example as described in the already cited work by A. Dalla Torre et al., "Analysis of the Accuracy of Indoor GNSS Measurements and Positioning Solution" European Navigation Conference ENC08, where the conventional integrity test has been adapted to the condition typical of urban and indoor environments.

The effectiveness of the method according to the described invention embodiment can be demonstrated conducting tests on a population of GPS fixes in association with PLMN fixes characterized by an error of 250 m and an accuracy of 300 m, conditions that are typical of the localization performance obtainable for example using the cell-ID method described in the foregoing in urban environment.

The Applicant conducted experimental trials that has proved the efficacy of the described method. The results of the experiments have shown that the method according to the described embodiment of the invention allows improving the location performance, particularly in respect of the 95% (2*DRMS) and 99% (3*DRMS) of the cases.

In particular, let it be assumed to consider those cases in which the statistical test based on the post-fix residues, i.e. the integrity test, does not provide useful results (i.e., it does not allow identifying pseudo-range measurements affected by gross errors). Let the quality of the GPS fix be expressed by means of the value of the ratio between the committed error and the estimated error variance, in the 67%, 95% and 99% of the cases (the GPS fixes are assumed to be characterized by an error statistical distribution that is approximated by a Gaussian with variance given by the DRMS; in order to verify that this assumption is correct, all the GPS fixes population needs to be considered, the error of each GPS fix is normalized for the expected variance, and it is assessed whether the error in the 67%, 95% and 99% of the cases correspond to the variance—DRMS—, twice the variance and three times the variance, respectively).

Column 1 in the table below lists the results when no integrity test is performed; it can be appreciated that the distribution is not Gaussian (i.e., the normalized error in the 67%, 95% and 99% of the cases is not equal to 1, 2 and 3).

It has been obtained that when the integrity test has a negative outcome, i.e., it does not indicate the existence of outliers (in other words, the integrity test is passed), the normalized error in the 67%, 95% and 99% of the cases is approximately equal to 1, 2 and 3, respectively, i.e. the error statistical distribution is approximately Gaussian (column 2 of the table below). In the cases where the integrity test is not passed, the error statistics is significantly worse than the expected one, and a presence of an error is actually denoted (column 3 in the table below: the normalized error in the 67%, 95% and 99% of the cases is greater than 1, 2 and 3, respectively, meaning that the error statistical distribution is wider than a Gaussian, indicating the existence of gross errors).

In column 4 of the table, the results obtained by applying the method according to the described invention embodiment are reported. By comparing the values in column 4 with those in column 3, it can be seen that there is an improvement compared to those cases in which no FDE algorithm is implemented; thus, the solution according to the described embodiment of the invention is useful in those cases where it is not possible to implement a statistical FDE algorithm because the number of available pseudo-range measurements is insufficient.

The results obtained by applying the method according to the described invention embodiment are then compared to those obtained by applying a conventional FDE algorithm. A comparable improvement is achieved by applying the method according to the described invention embodiment (slightly less up to the 95% of cases, significantly higher in the 99% of the cases, column 4 and 5 in the table below).

In both cases (columns 4 and 5) the integrity test not always allows identifying the outliers, to discard them and thus to calculate a more accurate GPS fix. Columns and 5 in the table below shows that the statistical distribution of the discarded pseudo-range measurements is not a Gaussian, thus the quality of the GPS fix is not guaranteed.

By implementing the combination of the statistical FDE algorithm followed by the method according to the described embodiment of the present invention, the accuracy in the GPS fix increases in the 95% and 99% of the cases, compared to the results obtainable by applying the statistical test only. The results are summarized in the table below (column 6 in the table below: the statistical distribution is narrower compared to column 4).

exceeds the predetermined threshold (e.g., 3-4 Km), the PLMN fix may be considered non-reliable, and the method not be applied.

In order to further improve the effectiveness of the method according to the described invention embodiment, the recursive exclusion of one pseudo-range measurement at a time and the recalculation of the GPS fix may be performed only in those cases where the accuracy estimated by means of the weighted least square method is not relevant; a worsening of the 30% may be tolerated.

Thus, the method according to the described embodiment of the present invention may be advantageously exploited in those cases where despite the integrity test can be applied, it does not allow identifying outliers: an FDE procedure can be implemented exploiting the PLMN fix.

The method according to the described embodiment of the present invention can be advantageously applied also independently of the statistical test based on the post-fix residues, taking into considerations all the available pseudo-range measurements. In this way, when the accuracy of the PLMN fix is particularly accurate (e.g., when the PLMN topology is characterized by particularly dense cells, or when the PLMN fix is obtained exploiting triangulation methods, with accuracy of the order of 200 m), and in case the GPS fix significantly differs from the PLMN fix, pseudo-range measurement can be excluded one at a time in the calculation of the GPS fix, so as to discard pseudo-range measurements that are strongly perturbed (even if possibly not outside the statistic); if, excluding one pseudo-range measurement, the re-calculated GPS fix approaches the PLMN fix, the excluded pseudo-range measurement is an outlier.

Thanks to the method of the described embodiment of the present invention, the estimation of the position is improved.

In other words, the method according to the present invention is useful when the number of pseudo-range measurements available at the receiver (i.e., the number of visible satellites) is sufficient for performing the integrity test but not to perform the FDE algorithm, or as a complementary FDE procedure, when the FDE based on the post-fix residuals does

| % of cases | Column 1 All Fixes 100% | Column 2 $\chi^2$ test passed 95% | Column 3 $\chi^2$ test failed 5% (no fault detection) | Column 4 $\chi^2$ test failed 5%; fault detection based on PLMN fix | Column 5 $\chi^2$ test failed (fault detection) 5% | Column 6 $\chi^2$ test failed 5% PLMN fix & $\chi^2$ test fault detection |
|---|---|---|---|---|---|---|
| 67% | 0.99 | ~1 | 1.71 | 1.65 | 1.2 | 1.23 |
| 95% | 2.2 | ~2 | 28.8 | 6.9 | 4.6 | 3.3 |
| 99% | 4.1 | ~3 | 99 | 26 | 54 | 26 |

A possible explanation may be that when the GPS fix is re-calculated excluding a pseudo-range measurement that is not an outlier, and the re-calculated GPS fix more closely approximates the PLMN fix (i.e., there is a bias towards the position calculated based on the PLMN information), the GPS fix remains accurate and the decrease in performance is not relevant. When instead the method according to the described invention embodiment allows to isolate an outlier, the precision of the GPS fix significantly increases.

Preferably, a threshold may be set to the accuracy of the PLMN fix, so that when the PLMN fix accuracy is worse than the predetermined threshold (e.g., 500 m), the PLMN fix is considered non-reliable, and the method is not applied.

Also, in practical embodiments of the invention, an upper threshold may be set to the difference between the GPS fix and the PLMN fix; for example, in case such difference not allow identifying an outlier, and as a companion test to the integrity test. When the number of pseudo-range measurements available at the receiver is not sufficient for performing the integrity test, and there is a discrepancy between the GPS fix and the PLMN fix (and the respective accuracies), the GPS fix is re-calculated by excluding one pseudo-range measurement at a time, and it is assessed whether the re-calculated GPS fixes approach the PLMN fix.

Moreover, the method of the present invention can be useful when the FDE based on the post-fix residuals has not been able to improve the accuracy of the GPS fixes discarded based on the integrity test. When there are no degrees of freedom (because the number of equations in the system of equations to be solved for calculating the GPS fix is equal to the number of unknown variables), and the integrity test cannot be applied, if the estimated error for the GPS fix is better compared to the error of the PLMN fix, and the ratio of the difference between the GPS fix and the PLMN fix exceeds a preset threshold, it can be deduced that there are problems in the certification of the GPS fix.

The method according to the present invention is applicable in general to any GNSS receiver, in particular to a GPS or modernized GPS (evolution of the GPS) receivers, Galileo and Glonass.

The invention has been here described in connection with some embodiments thereof. In order to comply with contingent needs, those skilled in the art can bring several modifications to the described embodiments, as well as alternative embodiments of the invention, without departing from the scope of protection defined in the appended claims.

For example, although in the embodiment described in the foregoing the method of the present invention is assumed to be implemented at the mobile communications terminal, in alternative embodiments of the invention the method may be implemented outside the mobile communications terminal, for example by the PLMN, or by the service center.

Also, although in the foregoing reference has been made to a PLMN, the present invention is not so limited, being applicable in general to other types of telecommunications networks, particularly any wireless communications network.

The invention claimed is:

1. A method of determining a geographic position of a mobile communications terminal operable in a wireless communications network and comprising a receiver of signals of a global navigation satellite system, comprising:
   calculating a first estimated position of the mobile communications terminal based on pseudo-range measurements related to a plurality of signals received from transmitters of the global navigation satellite system;
   calculating a second estimated position of the mobile communications terminal based on information provided by the wireless communications network;
   analyzing the first estimated position to derive an indication of whether at least one of the pseudo-range measurements is affected by errors, wherein said analyzing comprises comparing the first estimated position to the second estimated position to determine whether an estimated accuracy of the first estimated position is higher than an estimated accuracy of the second estimated position;
   in case an indication that at least one of the pseudo-range measurements is affected by errors is obtained as a result of said analyzing:
      recursively calculating at least one third estimated position based on pseudo-range measurements related to a respective sub-set of said plurality of signals received from transmitters of the global navigation satellite system, wherein each recursive calculation excludes a different pseudo-range measurement, and wherein recursively calculating at least one third estimated position comprises calculating at least two third estimated positions, each third estimated position corresponding to a different sub-set of said plurality of signals received from transmitters of the global navigation satellite system;
      evaluating whether each of the at least two third estimated positions is more accurate than the first estimated position; and
      in the affirmative case, taking as estimated position of the mobile communications terminal the calculated third estimated position that is closer to the second estimated position.

2. The method of claim 1, wherein:
   said indication that at least one of the pseudo-range measurements is affected by errors is derived in case the first estimated position differs from the second estimated position of more than a preset amount.

3. The method of claim 2, wherein:
   recursively calculating at least one third estimated position comprises calculating at least two third estimated positions, each third estimated position corresponding to a different sub-set of said plurality of signals received from transmitters of the global navigation satellite system.

4. The method of claim 2, wherein analyzing the first estimated position comprises:
   calculating a first degree of accuracy of the first estimated position;
   obtaining an indication of a second degree of accuracy of the second estimated position; and
   comparing the first estimated position and the second estimated position in case the first degree of accuracy is better than the second degree of accuracy.

5. The method of claim 4, wherein calculating a first degree of accuracy comprises:
   exploiting a variance/covariance matrix of an error estimated while calculating the first estimated position; or
   estimating an affecting the first estimated position a distance root mean square (DRMS) calculated as:

$$\mathrm{DRMS} = \sqrt{\sigma_{x1}^2 + \sigma_{x2}^2}$$

where $\sigma_{x1}$ and $\sigma_{x2}$ are diagonal elements in a north-east-up reference system.

6. The method of claim 4, wherein comparing the first estimated position and the second estimated position comprises:
   comparing a deviation of the first estimated position with respect to the second estimated position to a threshold related to the first degree of accuracy.

7. The method of claim 1, wherein analyzing the first estimated position comprises performing a statistical integrity test on post-fix residuals obtained by calculating a difference between the pseudo-range measurements and the first estimated position.

8. The method of claim 7, wherein recursively calculating at least one third estimated position based on pseudo-range measurements related to a respective sub-set of said plurality of signals received from transmitters of the global navigation satellite system comprises:
   solving a system of equations comprising said pseudo-range measurements related to said respective sub-set of said plurality of signals and estimated coordinates of the mobile communications terminal corresponding to the second estimated position.

9. The method of claim 1, wherein taking as estimated position of the mobile communications terminal the calculated third estimated position comprises discarding from said plurality of signals received from transmitters of the global navigation satellite system the signal affected by an error greater than a predetermined amount.

10. A system for determining a geographic position of a mobile communications terminal operable in a wireless communications network and comprising a receiver of signals of a global navigation satellite system comprising:
   first calculation modules operable to calculate a first estimated position of the mobile communications terminal based on pseudo-range measurements related to a plurality of signals received from transmitters of the global navigation satellite system;

second calculation modules operable to calculate a second estimated position of the mobile communications terminal based on information provided by the wireless communications network;

estimated position analysis modules operable to derive an indication of whether at least one of the pseudo-range measurements is affected by errors by comparing the first estimated position to the second estimated position to determine whether an estimated accuracy of the first estimated position is higher than an estimated accuracy of the second estimated position and, in case an indication is derived that at least one of the pseudo-range measurements is affected by errors as a result of said determining, further operable to:

cause the first calculation modules to recursively calculate at least one third estimated positions based on pseudo-range measurements related to a respective sub-set of said plurality of signals received from transmitters of the global navigation satellite system, wherein each recursive calculation excludes a different pseudo-range measurement, and calculate at least two third estimated positions, each third estimated position corresponding to a different sub-set of said plurality of signals received from transmitters of the global navigation satellite system;

evaluate whether each of the at least two third estimated positions is more accurate than the first estimated position; and in the affirmative case, take as estimated position of the mobile communications terminal the third estimated position that is closer to the second estimated position.

11. A mobile communications terminal operable in a wireless communications network and comprising a receiver of signals of a global navigation satellite system, comprising:

a calculation module operable to calculate a first estimated position of the mobile communications terminal based on pseudo-range measurements related to a plurality of signals received from transmitters of the global navigation satellite system;

an estimated position analysis module operable to receive a second estimated position from the wireless communication network and to derive an indication of whether at least one of the pseudo-range measurements is affected by errors by comparing the first estimated position to the second estimated position to determine whether an estimated accuracy of the first estimated position is higher than an estimated accuracy of the second estimated position and, in case an indication is derived that at least one of the pseudo-range measurements is affected by errors as a result of said analyzing, further operable to:

cause the calculation module to recursively calculate at least one third estimated position based on pseudo-range measurements related to a respective sub-set of said plurality of signals received from transmitters of the global navigation satellite system, wherein each recursive calculation excludes a different pseudo-range measurement, and calculate at least two third estimated positions, each third estimated position corresponding to a different sub-set of said plurality of signals received from transmitters of the global navigation satellite system;

evaluate whether each of the at least two third estimated positions is more accurate than the first estimated position; and in the affirmative case, take as estimated position of the mobile communications terminal the third estimated position that is closer to the second estimated position.

* * * * *